Figure 6:
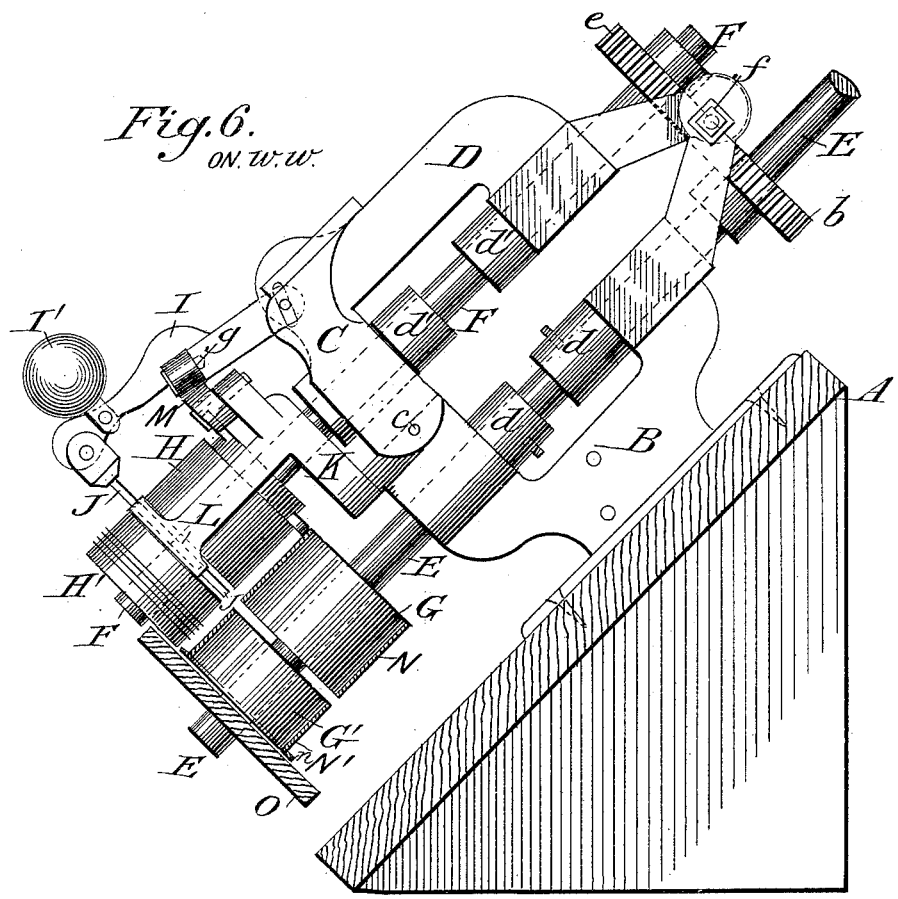

(No Model.) 5 Sheets—Sheet 1.
M. V. B. ETHRIDGE.
STAMP CANCELING AND POSTMARKING MACHINE.
No. 467,889. Patented Jan. 26, 1892.
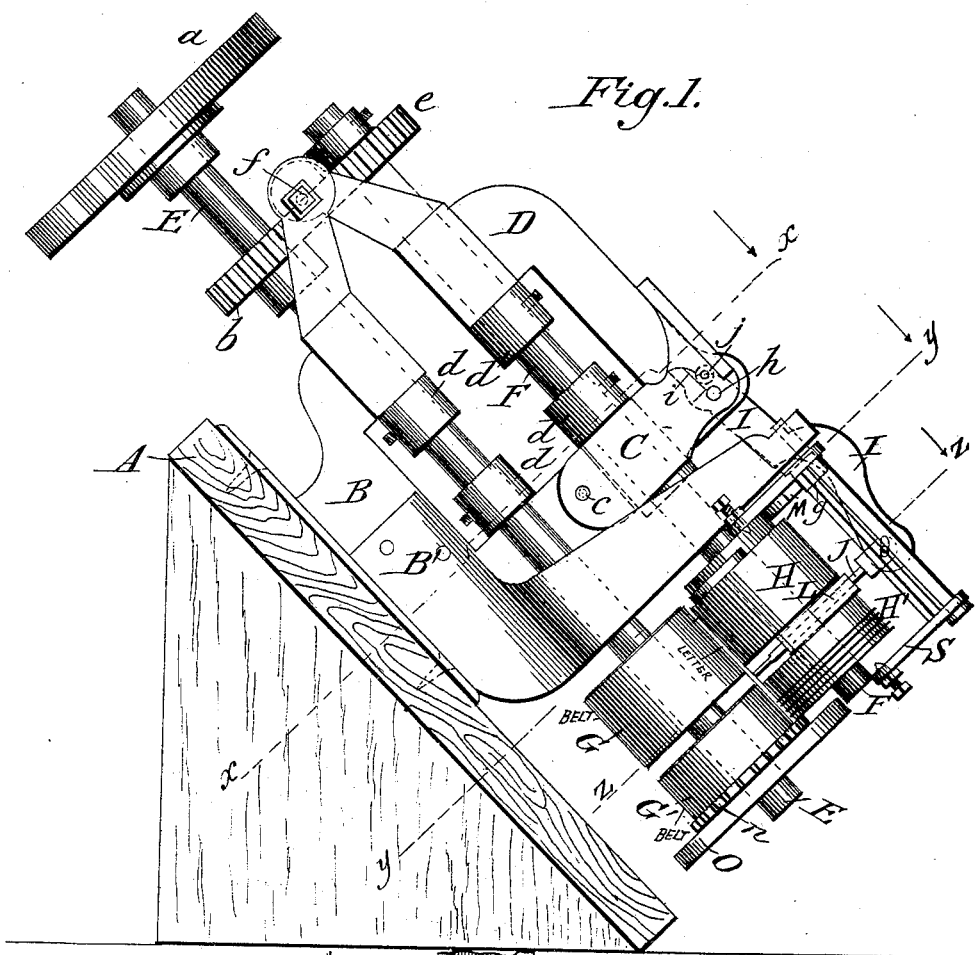
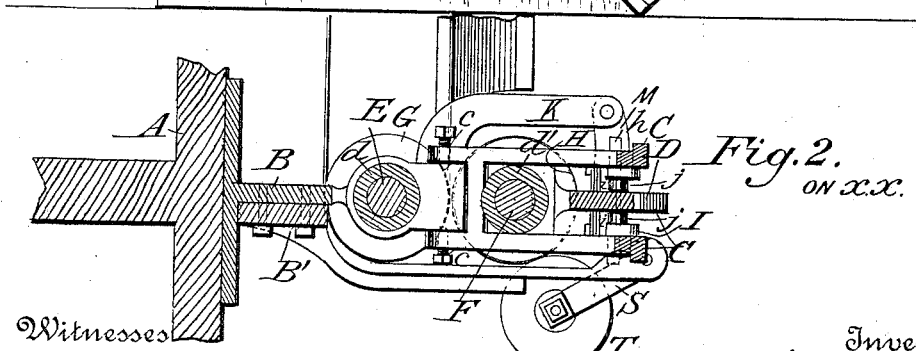
Witnesses
H. H. Schott
Fred E. Tasker
Inventor
Martin V. B. Ethridge
By his Attorney John C. Tasker (No Model.) 5 Sheets—Sheet 2.
M. V. B. ETHRIDGE.
STAMP CANCELING AND POSTMARKING MACHINE.
No. 467,889. Patented Jan. 26, 1892.
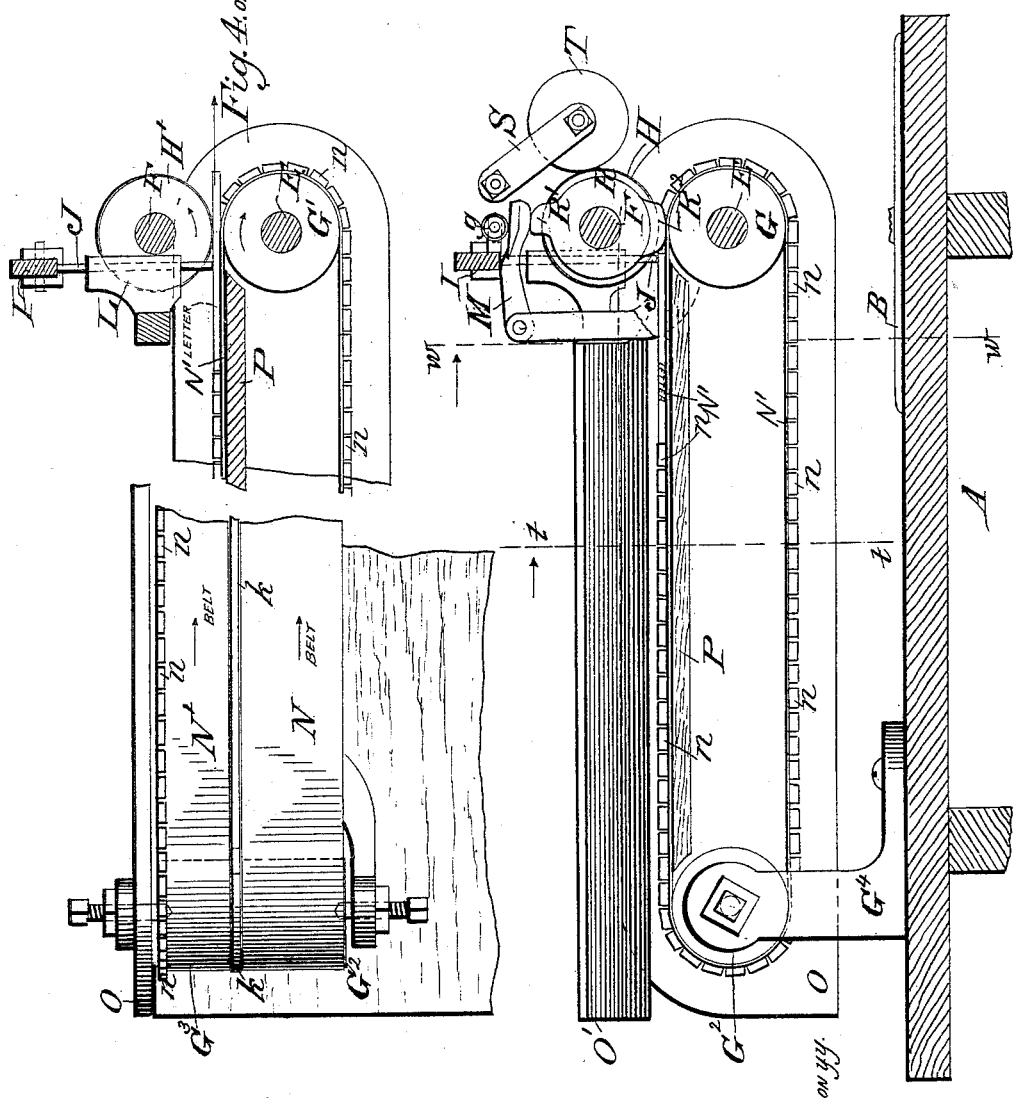

(No Model.) 5 Sheets—Sheet 3.
M. V. B. ETHRIDGE.
STAMP CANCELING AND POSTMARKING MACHINE.

No. 467,889. Patented Jan. 26, 1892.

Witnesses
F. H. Schott
Fred E. Tasker

Inventor
Martin V. B. Ethridge
By his Attorney John C. Tasker

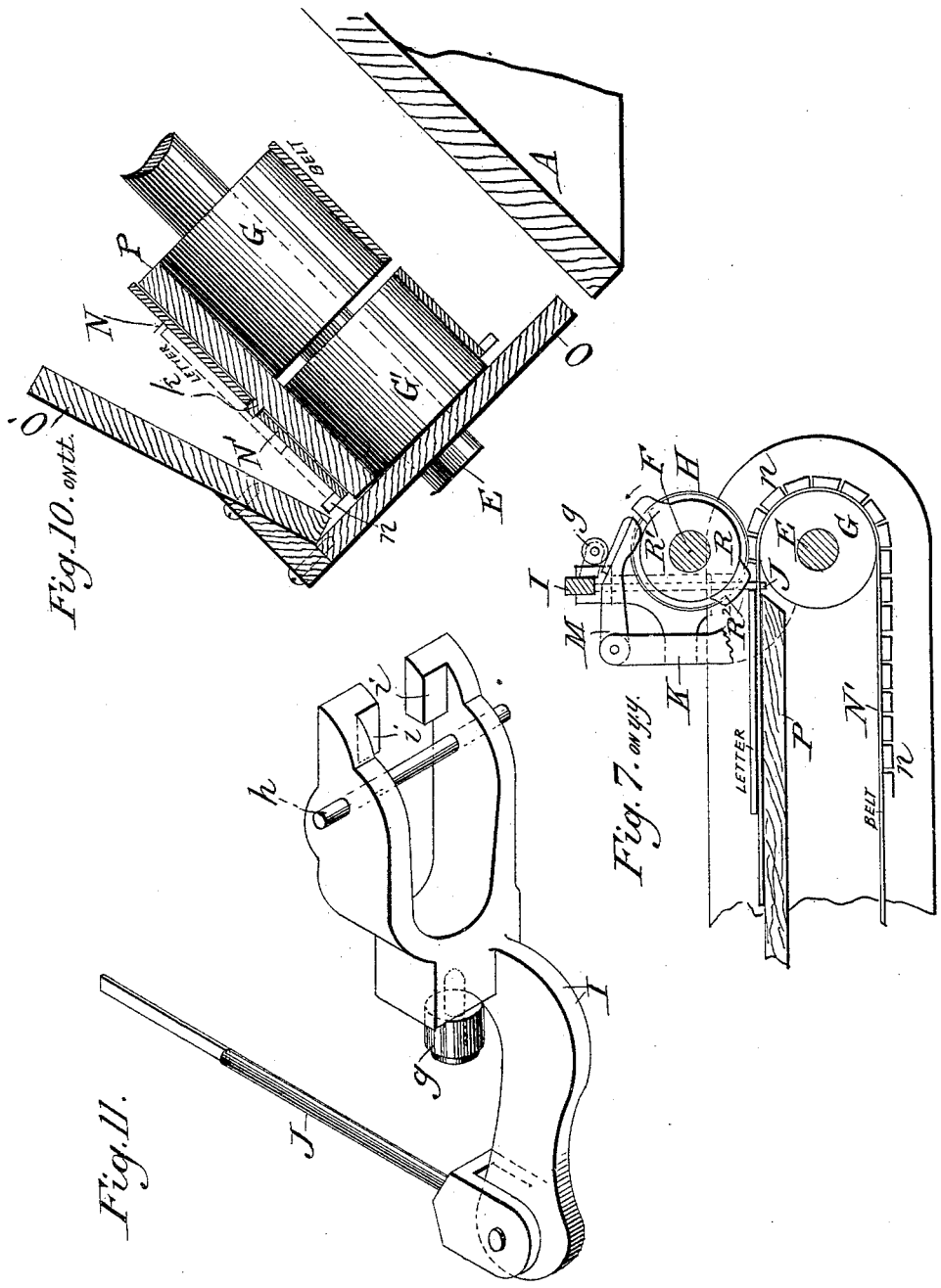

(No Model.) 5 Sheets—Sheet 5.
M. V. B. ETHRIDGE.
STAMP CANCELING AND POSTMARKING MACHINE.
No. 467,889. Patented Jan. 26, 1892.
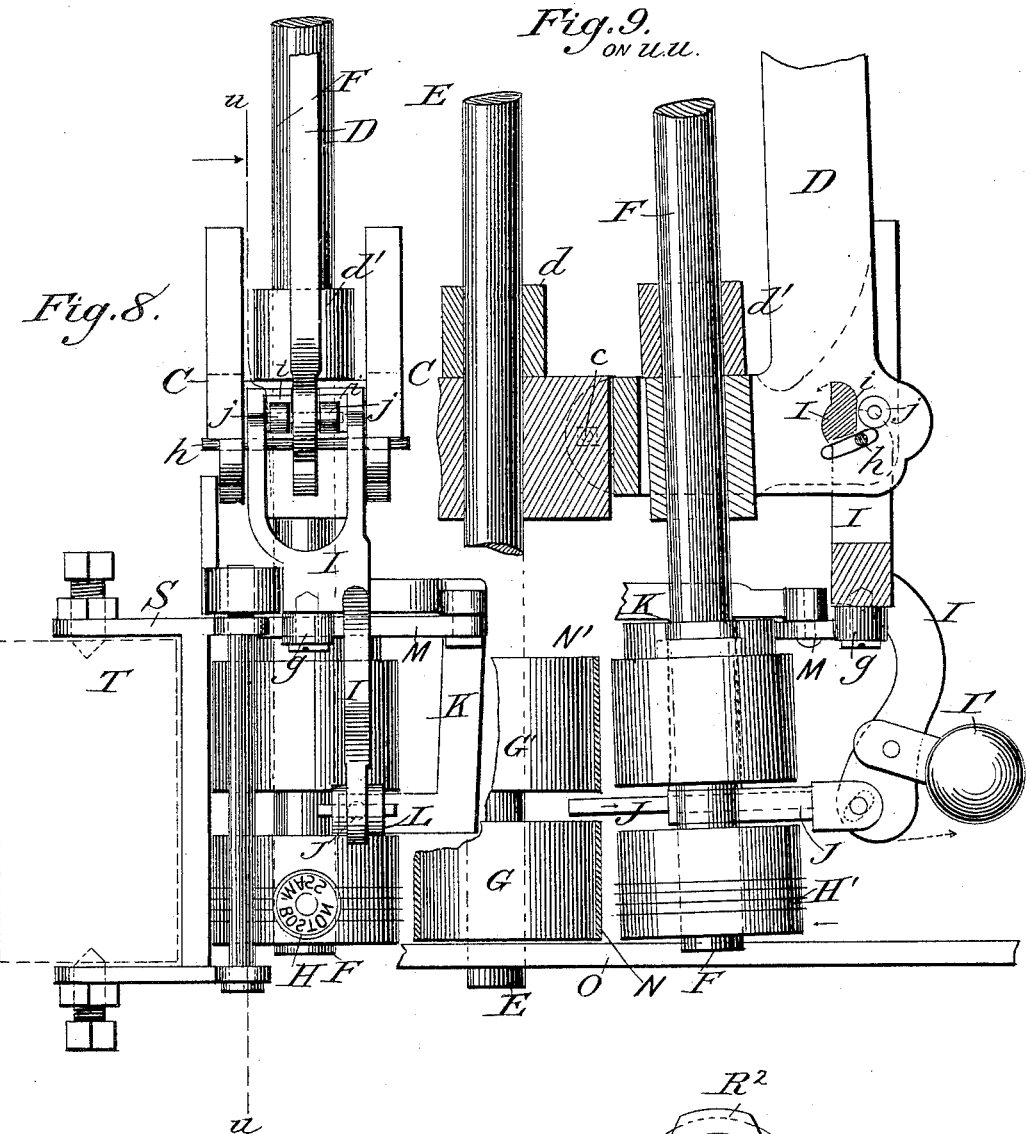
Witnesses
F. H. Schott
Fred E. Tasker
Inventor
Martin V. B. Ethridge
By his Attorney John C. Tasker

UNITED STATES PATENT OFFICE.

MARTIN V. B. ETHRIDGE, OF BOSTON, MASSACHUSETTS.

STAMP-CANCELING AND POSTMARKING MACHINE.

SPECIFICATION forming part of Letters Patent No. 467,889, dated January 26, 1892.

Application filed April 26, 1888. Serial No. 271,963. (No model.)

*To all whom it may concern:*

Be it known that I, MARTIN V. B. ETHRIDGE, a citizen of the United States, residing at Boston, in the county of Suffolk and State of Massachusetts, have invented certain new and useful Improvements in Stamp-Canceling and Postmarking Machines; and I do hereby declare the following to be a full, clear, and exact description of the invention, such as will enable others skilled in the art to which it appertains to make and use the same.

My invention relates to an improvement in machines for stamp-canceling and postmarking letters, cards, newspapers, and other pieces of mail-matter, the object being to provide means whereby an accurate registry of the cancellation and postmark may be made with rapidity and certainty upon pieces of mail-matter of varying sizes and widths.
It consists, essentially, in supporting-rollers and feeding-belts for the mail-matter running above said rollers, a marking or printing roller whose shaft is carried in an oscillating frame, said frame being engaged by a weighted lever that supports or restrains it in such a manner as to hold the marking-roller away from the feeding-belts, while an arm pivoted to the weighted lever depends between said belts, this position of the marking-roller being maintained, except when a cam, once in each revolution of the marking-roller, operates to raise the long arm of the lever and the depending arm, thus removing the restraint from the oscillating frame, so that if a letter now passes under the arm the marking roller or stamp for printing the mail-matter will assume its printing position, because said dependent arm will rest upon the letter which now covers the space between the belts, prop up the weighted lever, and thereby allow the stamp to come down and remain down, so that a registry of the cancellation and postmark may be made upon the mail-matter.
The invention further consists in certain peculiarities in the construction, arrangement, and combination of the several mechanical parts of which my improved stamp-canceling machine is composed, substantially as will be hereinafter fully described, and then more particularly pointed out in the claims.

In the accompanying drawings, illustrating my invention, Figure 1 is a right-hand end elevation of my improved stamp-canceling and postmarking machine. Fig. 2 is a sectional plan view on the line *x x* of Fig. 1. Fig. 3 is a sectional plan view on the line *y y* of Fig. 1. Fig. 4 is a partial sectional plan on the line *z z* of Fig. 1 and shows the depending arm resting upon a letter which is passing beneath the marking-roller. Fig. 5 is a partial sectional plan of the machine on a plane parallel to the base and above the conveying-belts. Fig. 6 is an elevational view of my improved machine, looking from the left hand and in partial section on the line *w w* of Fig. 3. Fig. 7 is a partial sectional plan on the line *y y* of Fig. 1. This view is similar to the view shown in Fig. 3, but indicates the position of the depending arm when it is between the belts and acting as a letter-stop, and the position of the cam on the marking-roller when said cam is not in action, while in Fig. 3 the depending arm is represented as resting upon the letter and the cam as being in action for the purpose of elevating this depending arm. Fig. 8 is a top plan view of the stamp-canceling mechanism. Fig. 9 is a vertical sectional elevation on the line *u u* of Fig. 8 looking toward the right hand. Fig. 10 is a cross-section on the line *t t* of Fig. 3. Fig. 11 is a detail perspective view of the weighted lever which engages the oscillating frame and the depending arm which is pivoted to said lever, the parts being in such a position as to show the construction most clearly. Fig. 12 is a detail end elevation of the marking-roller, showing the cam with which
said roller is provided.

Like letters of reference designate corresponding parts throughout all the different figures.

My invention pertains to that class of stamp-canceling and postmarking machinery wherein the mail-matter is fed to the printing mechanism in an inclined edgewise position upon an inclined moving bed; and hence the parts of the machine are arranged in an inclined manner, and in consequence I find it most convenient to employ an inclined bed A, suitably mounted or supported, to which bed the main frame B is securely fastened by means of screws or other attaching devices, as shown in the drawings. Another part of the main frame is lettered B'. It is secured to the part lettered B, as shown in Figs. 1 and 2.

E denotes the main driving-shaft. It is journaled in immovable bearings in the main frame of the machine. It is situated in an inclined position, as shown. It carries near its upper extremity a pulley $a$, by means of which power is applied to actuate it. It also carries a gear-wheel $b$, which meshes with a gear $e$ on the shaft F, and in this manner the said shaft F is driven, as will be hereinafter explained. The shaft E is provided with suitable collars or sleeves $d\ d$ having set-screws, said collars being for the purpose of keeping the shaft in proper position and preventing it from slipping out of its bearings. The shaft E carries near its lower end two rollers G and G', which serve to carry the endless conveying-belts N and N', and are likewise useful as impression-rollers, since they are situated directly beneath the marking or printing devices. The lower end of the said shaft E passes through the inclined side O, which forms a part of the hopper.

To the side O is secured a longitudinal plate or board O', which is located adjacent to the conveying-belts, and which, in connection with said belts and the side O, constitutes the hopper, into which the letters are fed before they start on their way to the printing mechanism. The longitudinal traveling belts N and N' not only pass around the rollers G G' on the shaft E, but they are also supported by rollers $G^2$ and $G^3$, held in a standard $G^4$, fastened on the inclined bed A at a suitable point distant from the frame B.

In addition to the rollers just mentioned, which are used to support and actuate the letter-conveying belts N and N', there is a table or bed P, (see Figs. 3 and 10,) upon which the belts travel, said table or bed having a longitudinal rib $k$, (see Figs. 5 and 10,) which projects upward between the two belts and keeps them separated. It will thus be perceived that the belts are horizontally inclined and that they run in a direction at right angles to that in which the main driving-shaft E is located, and, furthermore, that the belts are separated for a short distance sufficient to permit the depending arm (to be hereinafter described) to extend downward between them at a point close to the printing-roller. The lower belt N' is furnished along its edge with a series of projections $n\ n$, which help to align the letter, prevent its being delayed by friction on the lower edge, and keep the letter after it has been aligned on the belt from coming into contact with the side and bottom of the hopper-frame, and thus carry it to the printing mechanism in the proper position.

D denotes an oscillating frame hung above the main frame, to which it is pivoted at $f$. In the oscillating frame D is journaled the shaft F in an inclined direction substantially parallel to shaft E, said shaft F being furnished with suitable collars $d'\ d'$, which maintain it in the proper position and keep it from slipping out of its bearings, and said shaft F having, as already seen, a gear $e$, meshing with the gear $b$ on the shaft E, so that the shaft F may be driven simultaneously with the shaft E. The shaft F carries a roller H, having a cam R, formed with the two projecting portions R' and $R^2$, said roller H being located above the roller G. The shaft F also carries the marking or printing roller H', located above the roller G' and provided with suitable stamp-canceling and postmarking dies, examples of which are seen in Fig. 8. On each side of the forward end of the oscillating frame D are located upright standards C C, the lower ends of which are pivoted to the main frame of the machine at suitable points. Between these standards the forward end of the frame D has a vertical movement when said frame swings upon its pivot $f$.

In Fig. 11 is shown a lever I, to the outer end of which a depending arm J is pivoted, said lever being ordinarily weighted by having attached thereto a suitable weight—as, for instance, that shown at I', Figs. 6 and 9—and said lever being arranged to act on the oscillating frame D to raise and lower the same. The lever I has a bifurcated end, through the prongs of which passes a horizontal pivot $h$, whose extremities are held in the upright parallel standards C C. Said pivot likewise passes through the oscillating frame D, a slot being provided in said frame, as shown in Fig. 9, so that during the oscillations of the frame the pivot may not hinder its movement. Thus the pivot serves as a fulcrum for the lever. The ends of the prongs of the bifurcated lever have flat faces at $i\ i$, which bear against anti-friction rollers $j\ j$, carried on studs, projecting horizontally from the oscillating frame D near its upper edge. Thus it will be seen that the lever I, being pivoted on pivot $h$ with its ends resting beneath the projecting parts on the oscillating frame, will, if vibrated up and down, operate to cause the oscillating frame to be raised or lowered. Inasmuch as the arm I has long leverage, it is evident that by providing its outer end with a spring or a weight, as the weight I', already mentioned, the oscillating frame may be held in its uppermost position, except when some agency acts to lift the weighted lever and correspondingly depress the frame D. As the oscillating frame carries the marking or printing roller, it is clear that when said frame is elevated the marking-roller will be held away from the belts. Moreover, the dependent arm J is pivoted to the end of the weighted lever and is of such a length that when the weighted lever is in its normal position said arm will extend downward between the belts N and N' at a point close to the marking-roller. This position of the dependent arm is seen in Fig. 9, where the printing-roller will also be observed in its normal position revolving continuously above the letter-conveying belts. When an agency acts to lift the weighted lever and the depending arm out of the position shown in Fig. 9 to a position above the belts, it thereby removes the restraint of the oscillating frame, and thus allows the marking-roller to fall into close proximity to the letter-belt.

In Fig. 9 the depending arm acts as a letter-stop, because when in this position any letter or other piece of mail-matter which might be upon the conveying-belts and being carried along by them would be effectually retarded in its progress and hindered by the rod J depending in its path and barring its further movement. When the rod J is elevated, however, it will be removed clear of the letter, so that the latter may pass on beneath it without further hinderance.

It has already been seen that the roller H is provided with a cam R, having projecting points R' and $R^2$, which points are oppositely located. As the roller H rotates, therefore, the cam will likewise revolve. A short arm M is arranged to be acted upon by the cam, said arm being pivoted to a frame K, secured on the main frame, its free end being located directly beneath an anti-friction roller $g$, carried on a stud projecting from the lever I, as shown in the drawings. (See Figs. 8 and 9.) As the weighted lever is located above the cam-roller H, it is evident that during the movement of said roller the cam will lift the movable arm M, which will bear upon the roller $g$, and the weighted lever will be elevated. This elevation of the weighted lever will take place once in each revolution of the roller and removes the restraint from the oscillating frame. It will be noted that the projecting parts R' and $R^2$ of the cam R are not both set in the same line perpendicularly to the axis of the cam, but that one is offset from the other, as will be perceived upon inspection of Figs. 1 and 6. Owing to this difference in the position of the projecting parts of the cam only one of these projecting parts, as R', will come in contact with the arm M during the rotations of the roller; but said projecting parts are so arranged and related to the other adjoining mechanical elements that at the point of time when the part R' is in contact with and operating upon the arm M the part $R^2$ will be in contact with the roller G, and hence for the moment the lowering of the roller H and printing-roller H', which would otherwise be inevitably attendant upon the lifting of the weighted lever I, will be counteracted and the printing or marking roller will be kept in its normal position away from the conveying-belt long enough after the depending arm has been raised above the same to allow any letter, card, newspaper, or other piece of mail-matter, whatever be its thickness, size, or width, to pass beneath the depending arm and said printing-roller and be in a position to receive the impression to be made thereupon just as soon as the point $R^2$ of the cam is released from the roller G; whereas, on the other hand, if a piece of mail-matter does not pass under the arm and marking-roller at the time that said arm is elevated and said marking-roller is momentarily held away from the belt by the point of the cam $R^2$ said marking-roller will not soil the belt, because before the point $R^2$ is released from the roller G the marking-roller will be immediately elevated before the stamp-canceling and postmarking dies have time to register an impression upon the belt. When a letter passes beneath the depending arm, thereby supporting it, the marking-roller does not return to its normal position above the belts as soon as the point of the cam $R^2$ has been released from roller G; but the depending arm rests upon the letter which now covers the space between the belts, and the weighted lever is upheld, so that the oscillating frame is in its lowermost position and the marking-roller rolls upon the letter, and hence is in the position where it can operate to print it. It is thus evident that if a letter does not pass under the depending arm the marking-roller or stamp will not soil the belt, so that were a letter under the stamp-roller without being simultaneously under the depending arm, and thus acting in association therewith, it could not be printed. The letter acts, in association with the weighted lever, by its connections in the letter-path to liberate the stamp from the normally-restrained position wherein it cannot print and allow it to print.

Ink is supplied to the marking-roller by means of some suitable inking-roller—such, for instance, as that indicated at T in Fig. 9—said roller being carried in a frame S, which is hung on the main frame in such a manner that the inking-roller may by a spring or gravity preserve a constant contact with the marking-roller and thus keep the stamp-canceling and postmarking dies of the latter fully supplied with ink at all times.

The frame K, above alluded to as being fastened on the main frame, is provided with a tubular elongated box L, located above the letter-conveying belts just in advance of the marking-roller and adapted to receive loosely the depending rod J, said box serving as a guide for the rod during its play up and down. This box will be clearly seen by reference to Figs. 1 and 6. It is correspondingly inclined to suit the relative arrangement of the other mechanical parts of the invention, and by it the depending rod is enabled to drop accurately between the two belts which convey the letters to the marking-roller.

From the description of the structure and relation of the mechanical parts and the incidental statements therewith concerning the operation of those parts little of description respecting the complete operation and mode of using the invention herein described and shown will be needed to impart to those skilled in the art to which this invention relates a full and satisfactory understanding of the whole invention.

The letters, cards, newspapers, or other pieces or packages of mail-matter are fed into the hopper and aligned successively upon the inclined conveying-belts. By these bands the letters are carried forward until they meet a barrier in their path in the shape of the depending rod J, (see Fig. 7,) by which barrier their onward passage is interrupted and the letter remains in that stationary position until the rotation of the stamp canceling or marking roller H' has brought the stamp-canceling and postmarking dies carried thereby nearly to the point where their impression is to be made. The cam now operates in the manner already explained to lift the weighted lever, which in consequence draws up the depending rod J into a position where its lower end is above the letter. (See Fig. 6.) It has already been seen that the lifting of the weighted lever releases the oscillating frame and consequently the marking-roller from any restraint, although the cam acts in such a way that each time this restraint is removed when no mail-matter is passing the printing-roller moves in such a manner as not to soil the conveying-belt. When the barrier in the letter-path or the depending rod has been raised and the letter, which was temporarily retarded, has by the conveying-belt gone under the depending rod, the continued rotation of the cylinder will mark the letter, inasmuch as the weighted lever, which normally restrains the cylinder, will be supported by the letter, and therefore will no longer restrain the cylinder. However, the letter being now upon the conveying-belts and covering the space between them, the depending rod J cannot fall back and assume its former position between the belts; but in the act of returning to said position it will meet the letter and thus be stopped. Hence the weighted lever will not fall, and in consequence the elevation of the oscillating frame, which always attends the falling of the weighted lever, will not take place. The result of this is that the oscillating frame remains down and that the printing-roller also remains down and registers its impression upon the letter instantly after the point $R^2$ of the cam is released from the roller, or rather from contact with the conveying-belt, which passes around said roller. When the letter has passed the stop, been printed, and delivered beyond the printing mechanism, the stop will fall back again between the belts. The printing-roller will thereupon be raised again and the parts will be ready to repeat with the next piece of mail-matter the same operation that has already been described. It will be noted that once in each revolution of the marking-roller the cam operates to lift the weighted lever and the depending rod. It has been shown, however, that when a letter is not on the belt yet the latter will not be soiled or inked, because the parts are so arranged as to prevent this.

Having thus described my invention, what I claim as new, and desire to secure by Letters Patent, is—

1. The combination of the letter-conveying belts, the impression-roller, the marking-roller, an oscillating frame carrying said roller, a lever engaging the oscillating frame, the depending rod in the letter-path, and a cam on the shaft of the marking-roller, substantially as described.

2. In a machine for stamp-canceling and postmarking mail-matter, the combination of the impression-roller, the oscillating frame, the marking-roller carried thereby and having a cam on its shaft having oppositely-projecting points relatively offset from a line perpendicular to the axis of the cam, the lever engaging the oscillating frame, and the pivoted lever beneath the latter upon which the cam acts, substantially as described.

3. In a machine for stamp-canceling and postmarking mail-matter, a marking-roller and its shaft and a cam on said shaft having its points projecting in opposite directions and relatively offset from a line perpendicular to its axis, in combination with the impression-roller, the oscillating frame for the marking-roller, and the weighted lever and depending rod, substantially as described.

4. The combination of the marking-roller and its oscillating frame with the main supporting-frame of the machine, the weighted lever engaging the oscillating frame, the depending rod J, tubular box L for said rod, said box being carried on the frame K, secured to the main frame, the pivoted arm M on said frame K, and the cam R, all substantially as described.

5. The combination of the main frame B, the impression-roller, its shaft E, journaled in the main frame, the marking-roller, its shaft F, the oscillating frame D, carrying said shaft, the connecting gearing for the shafts, the weighted lever I, engaging the oscillating frame and the cam on the marking-roller shaft, and the depending rod J in the letter-path, substantially as described.

In testimony whereof I affix my signature in presence of two witnesses.

MARTIN V. B. ETHRIDGE.

Witnesses:
 CHAS. HALL ADAMS,
 H. E. REMICK.